(12) United States Patent
Bolz

(10) Patent No.: US 7,098,652 B2
(45) Date of Patent: Aug. 29, 2006

(54) ANALYTICAL CIRCUIT FOR AN INDUCTIVE SENSOR

(75) Inventor: Stephan Bolz, Pfatter (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/828,994

(22) Filed: Apr. 21, 2004

(65) Prior Publication Data
US 2004/0196026 A1 Oct. 7, 2004

Related U.S. Application Data

(63) Continuation of application No. PCT/DE02/04088, filed on Nov. 4, 2002.

(30) Foreign Application Priority Data

Nov. 7, 2001 (DE) ................. 101 54 642

(51) Int. Cl.
 G01P 3/48 (2006.01)
 G01M 1/16 (2006.01)
 G01P 3/44 (2006.01)
(52) U.S. Cl. ........................ 324/207.15; 324/207.21; 324/158.1; 73/462
(58) Field of Classification Search ................ 324/98, 324/99 D, 99 R, 100, 529; 73/503.3, 504.02, 73/116
See application file for complete search history.

(56) References Cited

U.S. PATENT DOCUMENTS

| | | | |
|---|---|---|---|
| 3,571,614 A | 3/1971 | Rolstead | 307/202 |
| 3,763,418 A | 10/1973 | Beck et al. | 321/45 |
| 4,095,179 A * | 6/1978 | Bremer et al. | 324/207.22 |
| 4,506,339 A * | 3/1985 | Kuhnlein | 702/146 |
| 4,700,891 A | 10/1987 | Hans et al. | 239/132.5 |
| 4,764,685 A | 8/1988 | Bleckmann et al. | 307/106 |
| 4,866,298 A * | 9/1989 | Kniss et al. | 327/58 |
| 4,931,940 A * | 6/1990 | Ogawa et al. | 701/101 |
| 5,065,045 A | 11/1991 | Mok | 307/355 |
| 5,291,133 A * | 3/1994 | Gokhale et al. | 324/207.25 |
| 5,656,969 A | 8/1997 | Pulvirenti et al. | 327/561 |
| 5,752,482 A | 5/1998 | Roettgen et al. | 123/322 |
| 5,936,439 A | 8/1999 | Pollersbeck | 327/110 |
| 6,100,680 A | 8/2000 | Vig et al. | 324/207.2 |
| 6,181,171 B1 | 1/2001 | Graf et al. | 327/110 |
| 6,232,770 B1 * | 5/2001 | Schroeder | 324/207.21 |
| 6,236,122 B1 | 5/2001 | Maeda et al. | 307/125 |
| 6,279,375 B1 | 8/2001 | Draxelmayr | 73/1.88 |
| 6,351,162 B1 | 2/2002 | Schwartz | 327/110 |
| 6,552,531 B1 | 4/2003 | Fey et al. | 324/207.12 |
| 6,603,341 B1 | 8/2003 | Tuchiya et al. | 327/390 |
| 6,625,516 B1 | 9/2003 | Niimi et al. | 700/170 |
| 6,666,090 B1 * | 12/2003 | Mori et al. | 73/504.02 |

(Continued)

FOREIGN PATENT DOCUMENTS

DE 2446193 7/1977

(Continued)

*Primary Examiner*—Vinh Nguyen
*Assistant Examiner*—Emily Y Chan
(74) *Attorney, Agent, or Firm*—Baker Botts L.L.P.

(57) ABSTRACT

An analytical circuit for an inductive electromagnetic sensor with external excitation (1) generates an output signal which is transformed to give an output signal (out), by means of transformation to a reference voltage (Vref) in an inverting low-pass filter (12), which has no hysteresis delay and is free from multiple triggering. By comparison of the reference voltage with three voltage thresholds in a diagnostic circuit (6), line interruptions and short-circuits are recognised by battery voltage or reference voltage potentials.

9 Claims, 2 Drawing Sheets

U.S. PATENT DOCUMENTS

| | | | |
|---|---|---|---|
| 6,724,227 B1 | 4/2004 | Imai | 327/108 |
| 6,788,128 B1 | 9/2004 | Tsuchida | 327/427 |
| 2004/0100150 A1 | 5/2004 | Bolz et al. | 307/116 |
| 2004/0130379 A1 | 7/2004 | Bolz et al. | 327/374 |

FOREIGN PATENT DOCUMENTS

| | | |
|---|---|---|
| DE | 42 07 371 C1 | 8/1995 |
| DE | 19609121 | 2/1997 |
| DE | 19751651 | 2/1999 |
| EP | 0330823 | 1/1989 |
| EP | 0415081 | 7/1990 |
| EP | 0574646 | 6/1992 |
| EP | 0684699 | 5/1994 |
| EP | 0 973 258 A2 | 5/1999 |
| WO | 9116765 | 10/1991 |

\* cited by examiner

ANALYTICAL CIRCUIT FOR AN INDUCTIVE SENSOR

CROSS REFERENCE TO RELATED APPLICATION

This application is a continuation of copending International Application No. PCT/DE02/04088 filed Nov. 4, 2002 which designates the United States, and claims priority to German application no. 101 54 642.4 filed Nov. 7, 2001.

TECHNICAL FIELD OF THE INVENTION

The invention relates to an analytical circuit for an inductive sensor of a shaft, in particular for a sensor for sensing the rotational behavior of the crankshaft of a motor vehicle internal combustion engine.

DESCRIPTION OF THE RELATED ART

For operation of a motor vehicle internal combustion engine, precise knowledge of the rotational behavior (angular position, angular velocity-rpm, acceleration) of the crankshaft or camshaft is required. An electronic engine controller can use this information among other things to determine the right instants for fuel injection and firing. These variables are also important for example for controlling automatic transmissions or anti-blocking systems.

In the course of the ongoing development of engine technology this data is increasingly used to determine derived variables. An example of this is the emission-relevant detection of misfires required by the legislator. During a combustion process (power cycle) in a cylinder the crankshaft experiences an acceleration, causing an increase in its angular velocity. If no combustion takes place, for example as a result of a misfire, there is no increase in this angular velocity.

The observation of the change in angular velocity (acceleration) over the power cycle therefore provides information about a successful combustion. It is important here that not the measured variable but a variable derived therefrom is used. A complicating factor in this case is that the ratio of derived variable to measured variable is extremely small: ~0.001.

These conditions impose demands on the detection precision of the measurement system which can scarcely still be met using known sensors suitable for use in motor vehicles.

The exacting requirements in terms of ruggedness, compatibility in respect of pollution and high temperatures have led to widespread use of magnetic sensors. These consist of a permanent magnet with a yoke made of ferromagnetic material (iron) for generating and maintaining a static magnetic field. A toothed gear wheel is mounted on the shaft to be measured in such a way that the teeth project into the static magnetic field. The alternation of tooth and gap in the moving toothed gear wheel produces a change in the magnetic field which is picked up by the sensor.

However, a passive magnetic sensor system (permanent magnet with iron yoke for generating and maintaining the static magnetic field and sensor coil in which an alternating voltage signal is induced as a result of changes in the magnetic field) has some disadvantages.

For example, the amplitude of the sensor voltage signal is approximately proportional to the frequency (~0.1V–100V at 20–6000 Hz) at which the teeth of the toothed gear wheel pass the sensor. Precise detection of the zero crossings of the sensor signal in such a wide range is very difficult to perform. Expensive twisted and shielded cables are required.

Small minimal amplitudes of the sensor signal necessitate complicated and intensive signal processing and the risk of crosstalk from EMC interference signals increases.

This sensor system permits only limited diagnostic options in the event of sensor or line faults. The large amplitude dynamics do not allow simple detection of line breaks by threshold value detection.

Moreover, the amplitude of the sensor signal is influenced by the strength of the field generated by the permanent magnet.

The magnet must therefore be closely toleranced, which pushes costs up further.

An improvement in the sensing accuracy of the sensor signal can be achieved through measurement of the sensor current, since the latter's amplitude for tooth sequence frequencies above the cutoff frequency (given by the L/R time constant) is—in contrast to the sensor voltage—approximately constant. By this means the contribution to the detection precision error caused by the analytical electronics can be substantially reduced.

With sensors with permanent magnet excitation there is however the problem that during current measurement—and the short circuit of the sensor that is necessary for this—the current generated in the sensor itself generates an opposing field which is opposite to the field generated by the permanent magnet.

If the sensor is now operated at high temperature and under strong mechanical vibration, there is the risk that the permanent magnet will be slowly demagnetized, as a result of which the sensor ultimately loses its function. Even without this opposing field, a typical crankshaft sensor loses approx. 30% of its magnetization during its lifetime.

Alternatively an electromagnetic sensor can also be operated by means of external excitation. In this case the permanent magnet is replaced by soft magnetic material, for example electrical sheet steel, and a constant current is applied to the sensor coil, said current then magnetizing the material. A creeping demagnetization does not take place in this case. In their effect, sensors with permanent excitation and external excitation are identical in terms of function.

JP 4-223272 A discloses an analytical circuit for an electromagnetic sensor which is connected by means of a coupling capacitor to the inverting input of an inverting amplifier. At the output of the amplifier there appears a voltage whose direct voltage potential is determined by a reference voltage applied to the non-inverting input. Given suitable sizing of the coupling capacitor, the alternating voltage at the input of the sensor is very small (only several mV peak-to-peak). A problem with this concept is the value of the coupling capacitor that is required in practice. It must be rated at more than 1000 µF in order to be still sufficiently low-resistance at a required minimum tooth sequence of, for example, 20 Hz (start cycle of the internal combustion engine). Too great an impedance of the capacitor would produce an alternating voltage at the sensor, as a result of which the lower cutoff frequency of the sensor would be shifted upward. Furthermore, the capacitor has to be designed for a dielectric strength of approx. 20V to ensure that no damage occurs in the event of a fault, for instance a short circuit to battery voltage. Furthermore, it must also be designed—as is usual in automotive electronics—for temperatures of up to 125° C. in continuous operation. A capacitor of this design format is on the one hand very expensive, and on the other hand unacceptably large. Moreover, this circuit comprises an operational amplifier connected as a Schmitt trigger which converts the analog output signal into a digital signal, for example a rectangular signal, so that it can be processed by a following digital frequency analysis unit.

However, the hysteresis associated with the Schmitt trigger causes a time shift in the switchover times during the detection of the voltage zero crossings, said time shift also being dependent on the amplitude of the input signal. This brings no improvement in measurement accuracy and is consequently not acceptable. For the reasons cited the known circuit is unsuitable for motor vehicle applications.

SUMMARY OF THE INVENTION

The object of the invention is to create a cheaper analytical circuit for an inductive sensor which, while providing increased EMC protection, avoids a time delay caused by hysteresis in the sensor signal and multiple triggerings and allows a simple diagnosis of the sensor with regard to short circuit and line interruption.

This object can be achieved according to the invention by an analytical circuit for an inductive sensor, in particular for a sensor for sensing the rotational behavior of the crankshaft of a motor vehicle internal combustion engine, comprising an electromagnetic sensor with external excitation by means of a constant current, a transconductance amplifier to whose inverting input the output signal of the sensor is fed, and whose output signal is converted in an inverting low-pass filter into a reference voltage which is supplied to the non-inverting input of the transconductance amplifier, a digitizing circuit comprising a Schmitt trigger and, in parallel with it, a voltage comparator, to both of which the output signal of the transconductance amplifier and the reference voltage are supplied, and whereby the Schmitt trigger outputs a hysteresis-affected output signal and the voltage comparator outputs a hysteresis-free output signal, and a logic circuit which forms a hysteresis-free output signal of the analytical circuit from the two output signals of the digitizing circuit and makes it available for further processing.

The logic circuit may have two inverters and four NAND gates, the input of the inverter and one input of the NAND gate can be connected to the output of the Schmitt trigger, the input of the inverter and the other input of the NAND gate can be connected to the output of the voltage comparator, the output of the inverter can be connected to one input of the NAND gate, and the output of the inverter can be connected to the other input of the inverter, the output of the NAND gate can be connected to an input of the NAND gate and the output of the NAND gate can be connected to an input of the NAND gate, and the two NAND gates may form a transparent RS flip-flop, whereby the output of the NAND gate is connected to the other input of the NAND gate and the output of the NAND gate at which the output signal of the sensor system can be tapped for further processing is connected to the other input of the NAND gate. An upper, a middle and a lower voltage threshold can be predefined, a line break can be detected when the reference voltage exceeds the middle voltage threshold, a short circuit to battery voltage potential can be detected when the reference voltage exceeds the upper voltage threshold, and a short circuit to reference voltage potential can be detected when the reference voltage exceeds the lower voltage threshold. A voltage divider located between a supply voltage and reference voltage potential can be provided for forming the upper, middle and lower voltage threshold, a voltage comparator can be provided in which the reference voltage is compared with the upper voltage threshold, a voltage comparator can be provided in which the reference voltage is compared with the middle voltage threshold, a voltage comparator can be provided in which the reference voltage is compared with the lower voltage threshold, and the levels of the output signals of the voltage comparators which are low when the reference voltage does not exceed the middle and upper voltage threshold or does not fall below the lower voltage threshold can be stored in a holding circuit from which they can be retrieved for further processing and can be cleared by means of a reset signal.

The object of the invention can also be achieved by a method for sensing the rotational behavior of the crankshaft of a motor vehicle internal combustion engine, using an analytical circuit for an inductive sensor, comprising the steps of:

providing an electromagnetic sensor signal with external excitation by means of a constant current, feeding the sensor signal to an inverting input of a transconductance amplifier, converting an output signal of the transconductance amplifier in an inverting low-pass filter into a reference voltage which is supplied to the non-inverting input of the transconductance amplifier, supplying the output signal of the transconductance amplifier and the reference voltage to a digitizing circuit comprising a Schmitt trigger and, in parallel to a voltage comparator, and whereby the Schmitt trigger outputs a hysteresis-affected output signal and the voltage comparator outputs a hysteresis-free output signal, and forming a hysteresis-free output signal of the analytical circuit from the two output signals of the digitizing circuit and making it available for further processing.

An upper, a middle and a lower voltage threshold can be predefined, a line break can be detected when the reference voltage exceeds the middle voltage threshold, a short circuit to battery voltage potential can be detected when the reference voltage exceeds the upper voltage threshold, and a short circuit to reference voltage potential can be detected when the reference voltage exceeds the lower voltage threshold. The method may further comprise the steps of forming the upper, middle and lower voltage threshold by a voltage divider located between a supply voltage and reference voltage potential, comparing the reference voltage with the upper voltage threshold, comparing the reference voltage with the middle voltage threshold, comparing the reference voltage with the lower voltage threshold, and storing the results of the comparison when the reference voltage does not exceed the middle and upper voltage threshold or does not fall below the lower voltage threshold for further processing. Reset means can be provided for resetting the comparison results. Storage means can be provided for storing the comparison results.

BRIEF DESCRIPTION OF THE DRAWINGS

An exemplary embodiment according to the invention will be explained in more detail below with reference to a schematic drawing, in which.

DETAILED DESCRIPTION OF THE PREFERRED EMBODIMENTS

Figure 1:
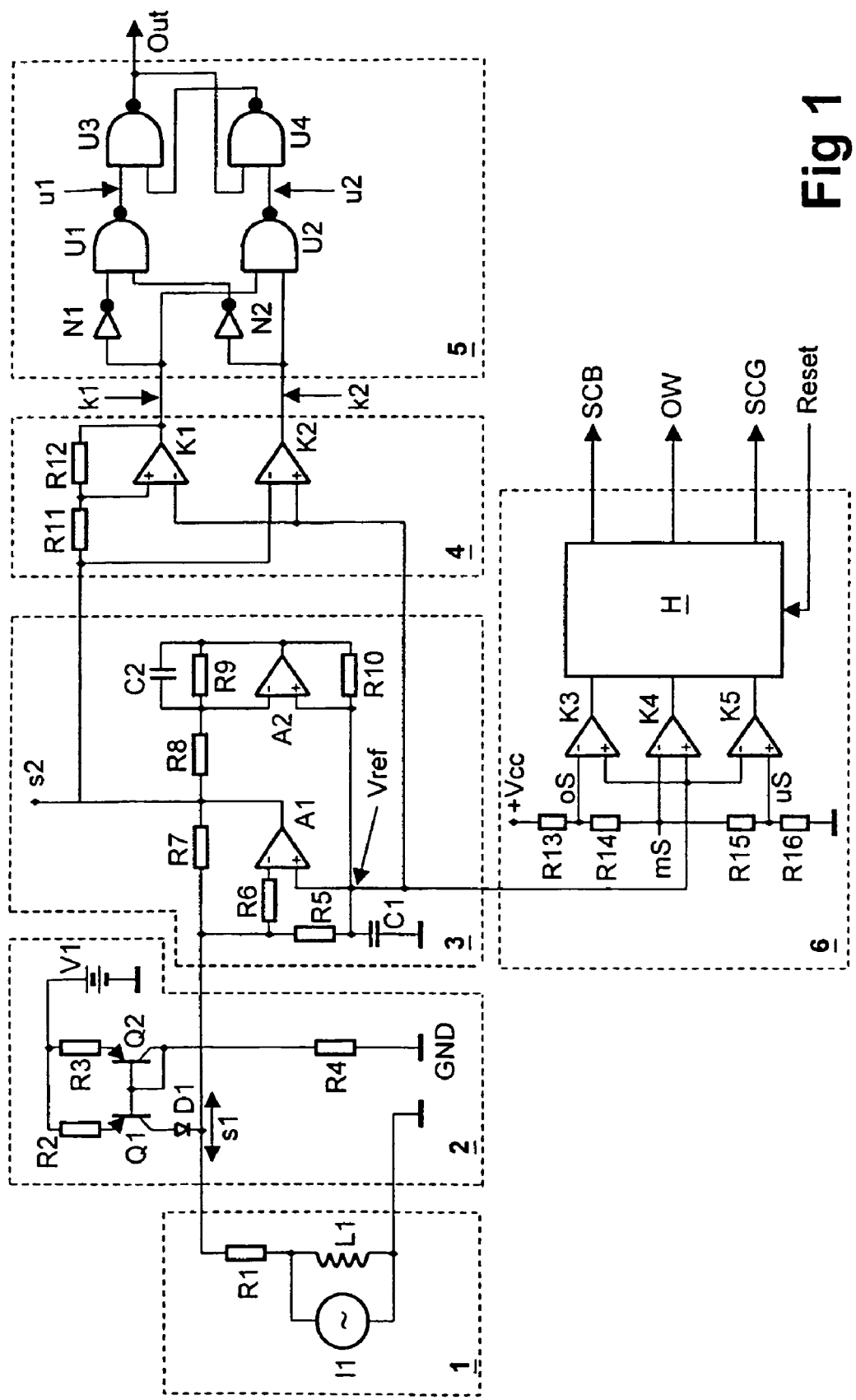
FIG. 1 shows the basic design of an analytical circuit according to the invention.

FIG. 1 depicts, in a frame with a dashed border, a sensor 1 externally excited by means of direct current as an alternating current source I1 which simultaneously represents the sensor short-circuit current. The inductor L1 connected in parallel with it represents the sensor inductance, while the resistor R1 connected in series with it represent the winding resistance at which a direct voltage used as a reference point for the reference voltage of the analytical circuit drops during external excitation by means of direct current.

If the sensor 1 is operated without output load, the alternating voltage increases proportionally to the frequency, as the impedance of the inductor L1 ($=2\pi L$) increases steadily and a bigger and bigger voltage drop is produced due to the alternating current source I1. If the sensor is operated in the short circuit, a current divider is produced between sensor inductor L1 and winding resistor R1. Above the cutoff frequency $\omega_0 = L1/R1$ the impedance becomes so great that the sensor current I1 flows mainly through the winding resistor R1.

The constant current source 2 for external excitation of the sensor 1 from a supply voltage source V1 (for example 5V) consists of a current mirror (Q1, Q2, R2 and R3) with polarity reversal protection diode D1 in the output.

Two transistors Q1 and Q2 whose base terminals are connected to one another and whose emitter terminals are each connected to the supply voltage source V1 via a resistor R2, R3 form the current mirror. Base and collector of transistor Q2 are connected to each other, so that the transistor acts as a diode, and are connected to reference voltage potential GND via a resistor R4.

The current through the series connection comprising R3, Q2 and R4 is determined by the values of the resistors and the voltage drop at Q2. If R3 is selected with a rating of 50 Ω and R4 with a rating of 370 Ω, with a supply voltage of 5V a current of approx. 10 mA will flow. If R2 is also selected with a rating of 50 Ω, 10 mA will likewise flow through transistor Q1 and diode D1—and in fact will do so largely independently of the collector potential of Q1. Diode D1 prevents a polarity reversal of Q1 in the event of a short circuit of the sensor line to battery and thus avoids destruction of the sensor. The collector current of Q1 flows into sensor 1 as an excitation current and generates a direct voltage drop of, for example, 2.5V at the winding resistor R1, on which voltage the sensor alternating current (signal s1 in FIG. 2) is then overlaid.

The sum of sensor direct and alternating current forms the sensor output signal s1, which is supplied to a following transconductance amplifier 3 with regulated reference voltage generation.

The transconductance amplifier 3, amplifier A1, is connected by its inverting input via a resistor R6 to the sensor 1 and the external excitation 2. Resistor R6 protects the input of amplifier A1 in the event of a short circuit to battery voltage. A negative feedback takes place by means of a resistor R7 which connects the output of A1 to sensor 1. The non-inverting input of A1 is likewise connected to sensor 1 via a resistor R5, whereby a series connection of R5 and a capacitor C1, which leads to the reference potential GND, represents a low pass. R5 also protects the non-inverting input of A1 in the event of a short circuit to battery voltage. The output of A1 is connected via a resistor R8 to the inverting input of an amplifier A2 which is also connected via a parallel connection of a resistor R9 and a capacitor C2 to the output of A2. As a result amplifier A2 acts as an inverting low pass.

Figure 2:
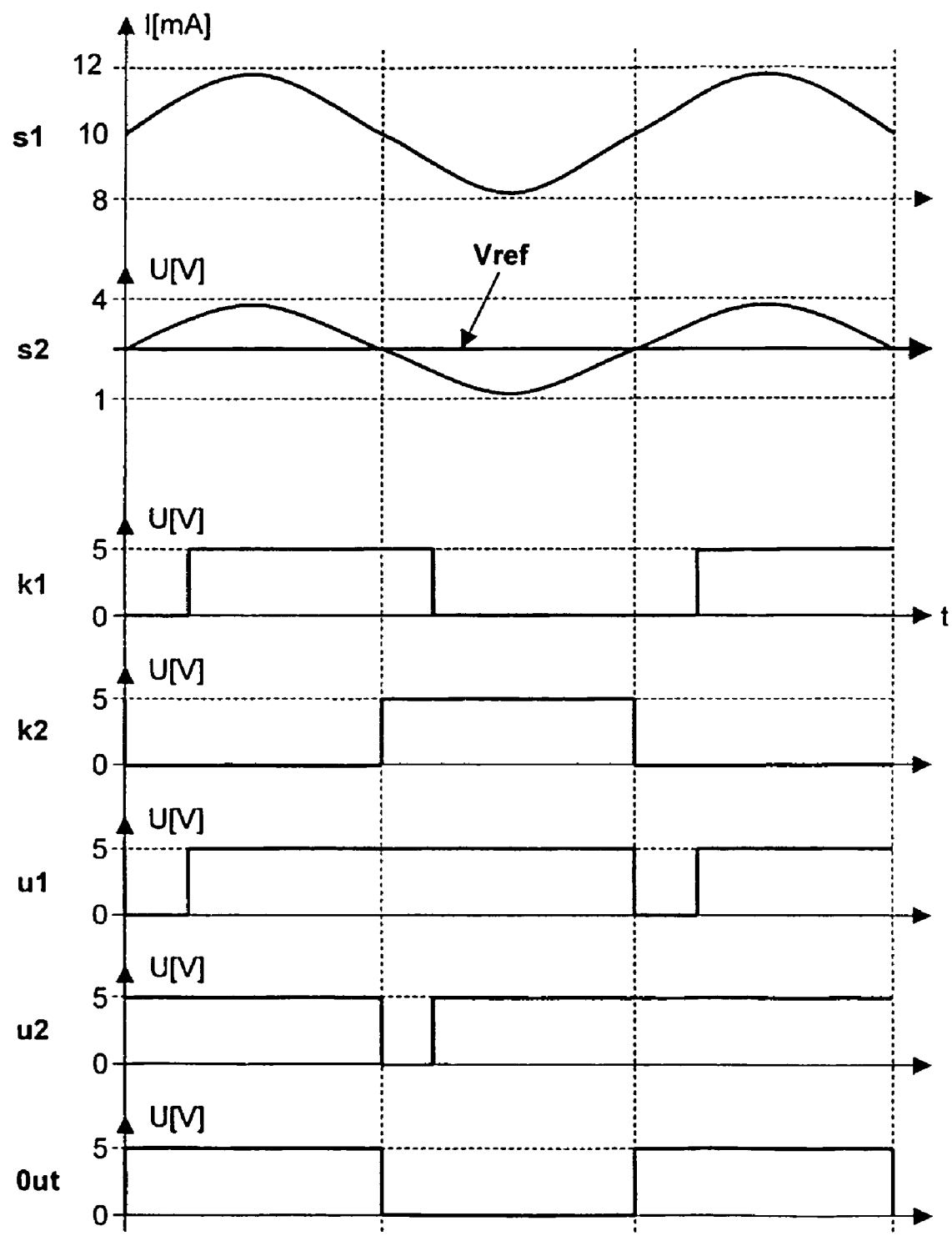
FIG. 2 shows different signal waveforms of this circuit.

The output of the amplifier A2 is connected via a resistor R10 to the non-inverting inputs of A2 and A1, with the result that the output voltage of A1, low-pass filtered and inverted in the amplifier A2, arrives at the non-inverting inputs as reference voltage Vref (see signal s2 in FIG. 2). Its value corresponds to the direct voltage dropping at the sensor. At the output of A1 there is therefore produced an alternating voltage whose size is determined by the product of the sensor alternating current and the value of the resistor R7. Through selection of R7 it is possible to set it to, for example, 3V (peak-to-peak). On the one hand this avoids a voltage limitation of the output of A1, and on the other hand the signal can then simply be processed further. In addition, as a result of the negative feedback with R7 the sensor alternating current does not lead to any significant alternating voltage at the sensor input. The sensor is therefore short-circuited in terms of alternating voltage.

The sensor voltage signal s2 (FIG. 2) appearing at the output of A1 is digitized by a digitizing circuit 4, consisting of a Schmitt trigger K1 and a voltage comparator K2 arranged in parallel with it.

Signal s2 arrives directly at the inverting input of the comparator K2 and, passing via a resistor R11, reaches the non-inverting input of the comparator K1, which is connected to its output via a further resistor R12. The inverting input of K1 and the non-inverting input of K2 are connected to the reference voltage Vref. As a result of the connection to R11 and R12, comparator K1 becomes a Schmitt trigger with hysteresis whose value results from the ratio of R11/R12 and the supply voltage of K1. At the output of K1 there appears the digital output signal k1 with a time delay caused by the hysteresis (signal k1 in FIG. 2).

In comparator K2, signal s2 is compared with the reference voltage Vref. Since no hysteresis is present here, the output switches exactly at a voltage difference of 0V at the inputs (signal k2 in FIG. 2). Small, noisy input signals can result in multiple triggering (switchover), however.

If the comparators K1 and K2 are supplied with a voltage of 5V, as is typically the case, then their output levels are 0V and 5V, which levels are suitable for further processing in logic gates.

The two output signals k1 and k2 of the comparators K1 and K2 are finally supplied to a logic circuit 5 in order to form the actual output signal Out. This logic circuit consists of two inverters N1 and N2, plus four NAND gates U1 to U4. The output of a NAND gate only has low level when both inputs simultaneously have high level. This applies to the NAND gates U1 to U4.

The input of the inverter N1 and an input of the NAND gate U2 are connected to the output of the Schmitt trigger K1.

The input of the inverter N2 and the other input of the NAND gate U2 are connected to the output of the comparator K2.

The output of N1 is connected to one input of U1; similarly, the output of N2 is connected to the other input of U1. The output of U1 is also connected to an input of U3; similarly, the output of U2 is connected to an input of U4. The output of U3 is connected to the other input of U4; similarly, the output of U4 is connected to the other input of U3.

The two fed-back NAND gates U3 and U4 form (according to Tietze/Schenk) a "transparent" RS flip-flop. The output of U3 represents the output of the logic circuit at which the signal Out is present. The truth table of this RS flip-flop looks as follows:

| u1 | u2 | Out |
|---|---|---|
| Low | Low | Not valid |
| Low | High | High |
| High | Low | Low |
| High | High | Out$_{-1}$ |

It can be seen from FIG. 1 and the signals shown in FIG. 2 that the inverted output signals k1 of the Schmitt trigger K1 and k2 of the comparator K2 are supplied to the NAND gate U1, at whose output a signal u1 is produced which is time-delayed due to the hysteresis of the Schmitt trigger.

The signals k1 and k2 are also supplied—without inversion—to the NAND gate U2, the output signal u2 of which has low level from the rising edge of the signal k2 to the falling edge of the signal k1.

In this way two signals u1 and u2 are obtained which are then supplied to the "transparent" RS flip-flop. The output signal Out of this flip-flop is high if u1=Low and u2=High, and is low if u1=High and u2=Low. If u1=u2=High, the previous state (Out$_1$) is maintained. Further switching states, caused for example by multiple triggering of the comparator K2, therefore have no effect.

All in all, in this way a digital signal Out has been produced at the output of the NAND gate U3, which digital signal switches in phase synchronism with the rising and falling crossings of the output voltage s2 of the transconductance amplifier A1 through the level of the reference voltage Vref. It has no hysteresis delay, and is free of multiple triggerings.

The output signal Out of the analytical circuit can now be supplied to, for example, a microcontroller (not shown) for further processing (frequency sensing, etc.).

The diagnostic circuit 6 for the inductive sensor consists of three comparators K3, K4 and K5, a voltage divider R13 to R16, and a holding circuit H.

The reference voltage Vref is present at the non-inverting inputs of the comparators K3 and K4 and also at the inverting input of the comparator K5. The inverting inputs of K3 and K4 and also the non-inverting input of K5 are connected to the voltage divider at different tapping points in each case.

The outputs of the comparators K3 to K5 are connected to the inputs of the holding circuit H, the outputs of which lead to a microcontroller (not shown). A reset line Reset is also connected to this microcontroller.

The voltage divider is connected to its supply voltage Vcc (5V) and reference potential GND in such a way that different voltages result at the three tapping points. By suitable selection of the resistor values of R13 to R16, for example, it is possible to create an upper (for example 4.8V), a middle (for example 4.0V) and a lower voltage threshold (for example 0.2V).

The outputs of the comparators K3 to K5 are pulled low when the reference voltage Vref is around approx. 2.5V, which may fluctuate by ±1V. This corresponds to the normal operating case, in other words the diagnostic state "no error".

If there is a line break, the reference voltage Vref, driven by the current from transistor Q1 of the current mirror Q1-Q2, will increase to approx. 4.3V. This causes K4 to switch to high level and this value is stored in the holding circuit H and the output OW of the holding circuit H likewise goes to high level.

In the event of a short circuit to battery voltage potential, the reference voltage Vref is limited to approx. 5.5V by the already described protection circuit. In this case K3 and K4 switch to high level, which is stored in the holding circuit H. The outputs SCB and OW assume high level. The switching of OW in the event of a short circuit to battery voltage can be prevented by an additional simple linking logic (not shown). A suppression of OW is also possible by means of the analytical software in the following microcontroller, however.

In the event of a short circuit to reference voltage potential, the value of the reference voltage Vref will become very small, as a result of which comparator K5 switches to high level. This level is likewise stored in the holding circuit H and the output SCG assumes high-level.

The already mentioned (but not shown) microcontroller can now interrogate and evaluate the signal levels SCB, OW and SCG present at the outputs of the holding circuit H and from this detect the presence of an error and its type (line break, short circuit to battery voltage potential, short circuit to reference voltage potential). After these signal levels have been read out, the microcontroller can reset the holding circuit H by means of the line Reset.

By repeated readout of the signals SCB, OW and SCG with subsequent resetting of the holding circuit in each case and observation of the variation with time of the signal levels it is also possible to distinguish between real, permanent errors and sporadic apparent errors possibly caused by interference voltages.

I claim:

1. An analytical circuit for an inductive sensor, in particular for a sensor for sensing the rotational behavior of the crankshaft of a motor vehicle internal combustion engine, comprising:
   an electromagnetic sensor with external excitation by means of a constant current,
   a transconductance amplifier to whose inverting input the output signal of the sensor is fed, and whose output signal is converted in an inverting low-pass filter into a reference voltage which is supplied to the non-inverting input of the transconductance amplifier,
   a digitizing circuit comprising a Schmitt trigger and, in parallel with it, a voltage comparator, to both of which the output signal of the transconductance amplifier and the reference voltage are supplied, and whereby the Schmitt trigger outputs a hysteresis-affected output signal and the voltage comparator outputs a hysteresis-free output signal, and
   a logic circuit which forms a hysteresis-free output signal of the analytical circuit from the two output signals of the digitizing circuit and makes it available for further processing.

2. The analytical circuit according to claim 1, wherein
   the logic circuit has two inverters and four NAND gates,
   the input of the inverter and one input of the NAND gate are connected to the output of the Schmitt trigger,
   the input of the inverter and the other input of the NAND gate are connected to the output of the voltage comparator,
   the output of the inverter is connected to one input of the NAND gate, and the output of the inverter is connected to the other input of the inverter, the output of the NAND gate is connected to an input of the NAND gate and the output of the NAND gate is connected to an input of the NAND gate, and the two NAND gates form a transparent RS flip-flop, whereby the output of the NAND gate is connected to the other input of the NAND gate and the output of the NAND gate at which the output signal of the sensor system can be tapped for further processing is connected to the other input of the NAND gate.

3. The analytical circuit according to claim 1, wherein an upper, a middle and a lower voltage threshold are predefined in a diagnostic circuit receiving said reference voltage, a line break is detected when the reference voltage exceeds the middle voltage threshold, a short circuit to battery voltage potential is detected when the reference voltage exceeds the upper voltage threshold, and a short circuit to reference voltage potential is detected when the reference voltage exceeds the lower voltage threshold.

4. The analytical circuit according to claim 3, wherein a voltage divider located between a supply voltage and reference voltage potential is provided for forming the upper, middle and lower voltage threshold, a voltage comparator is provided in which the reference voltage is compared with the upper voltage threshold, a voltage comparator is provided in which the reference voltage is compared with the middle voltage threshold, a voltage comparator is provided in which the reference voltage is compared with the lower voltage threshold, and the levels of the output signals of the voltage comparators which are low when the reference voltage does not exceed the middle and upper voltage threshold or does not fall below the lower voltage threshold are stored in a holding circuit from which they can be retrieved for further processing and can be cleared by means of a reset signal.

5. A method for sensing the rotational behavior of the crankshaft of a motor vehicle internal combustion engine, using an analytical circuit for an inductive sensor, comprising the steps of:

providing an electromagnetic sensor signal with external excitation by means of a constant current, feeding the sensor signal to an inverting input of a transconductance amplifier, converting an output signal of the transconductance amplifier in an inverting low-pass filter into a reference voltage which is supplied to the non-inverting input of the transconductance amplifier, supplying the output signal of the transconductance amplifier and the reference voltage to a digitizing circuit comprising a Schmitt trigger and, in parallel to a voltage comparator, and whereby the Schmitt trigger outputs a hysteresis-affected output signal and the voltage comparator outputs a hysteresis-free output signal, and forming a hysteresis-free output signal of the analytical circuit from the two output signals of the digitizing circuit and making it available for further processing.

6. The method according to claim 5, wherein an upper, a middle and a lower voltage threshold are predefined, a line break is detected when the reference voltage exceeds the middle voltage threshold, a short circuit to battery voltage potential is detected when the reference voltage exceeds the upper voltage threshold, and a short circuit to reference voltage potential is detected when the reference voltage exceeds the lower voltage threshold.

7. The method according to claim 6, comprising the steps of:

forming the upper, middle and lower voltage threshold by a voltage divider located between a supply voltage and reference voltage potential, comparing the reference voltage with the upper voltage threshold, comparing the reference voltage with the middle voltage threshold, comparing the reference voltage with the lower voltage threshold, and storing the results of the comparison when the reference voltage does not exceed the middle and upper voltage threshold or does not fall below the lower voltage threshold for further processing.

8. The method according to claim 7, wherein reset means are provided for resetting the comparison results.

9. The method according to claim 7, wherein storage means are provided for storing the comparison results.

* * * * *